(12) United States Patent
Rehling et al.

(10) Patent No.: US 11,607,762 B2
(45) Date of Patent: Mar. 21, 2023

(54) BOLT SETTING METHOD OF A NAIL-SHAPED BOLT AS WELL AS A SETTING DEVICE WITH AN ELECTRONIC CONTROL UNIT FOR IMPLEMENTING THE BOLT SETTING METHOD

(71) Applicant: Böllhoff Verbindungstechnik GmbH, Bielefeld (DE)

(72) Inventors: Stefan Rehling, Bückeburg (DE); Adnan Kolac, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 17/381,509

(22) Filed: Jul. 21, 2021

(65) Prior Publication Data

US 2022/0023982 A1 Jan. 27, 2022

(30) Foreign Application Priority Data

Jul. 21, 2020 (EP) .................................... 20187041

(51) Int. Cl.
*B23P 19/06* (2006.01)
*B25J 15/00* (2006.01)

(52) U.S. Cl.
CPC ......... *B23P 19/064* (2013.01); *B25J 15/0019* (2013.01)

(58) Field of Classification Search
CPC ....... B25J 11/007; B21J 15/025; B21J 15/285
See application file for complete search history.

(56) References Cited

U.S. PATENT DOCUMENTS 9,731,340 B2 8/2017 Draht et al.
10,730,100 B2 8/2020 Kohl
(Continued)

FOREIGN PATENT DOCUMENTS

| CN | 102666004 A | 9/2012 | |
|---|---|---|---|
| DE | 10 2010 006404 | * 8/2011 | ............... B25C 1/00 |
| DE | 102014007553 A1 | 11/2015 | |

(Continued)

OTHER PUBLICATIONS

English Machine Translation of WO 2019/158402 (Year: 2019).*

(Continued)

*Primary Examiner* — Christopher M Koehler
(74) *Attorney, Agent, or Firm* — Reising Ethington P.C.; Matthew J. Schmidt

(57) ABSTRACT

A bolt setting method and device for a nail-shaped bolt with a head and a shaft, ending in a tapered manner. The bolt setting method includes: joining the bolt into a component with a deforming stroke during which the bolt reaches a first joining speed of ≤4 m/s and the shaft completely penetrates the components with a portion of a maximum diameter with respect to a shaft length, without a bottom side of the head abutting the at least one component, and after the deforming stroke, driving the bolt into the at least one component until a head abutment of the bottom side of the head on the at least one component by at least one friction stroke with which a frictional connection between the shaft and the components is overcome and with which the bolt reaches a second joining speed that is smaller than the first joining speed.

14 Claims, 8 Drawing Sheets

(56) References Cited

U.S. PATENT DOCUMENTS 10,940,524 B2 * 3/2021 Kohl ................... B21J 15/025
2017/0189954 A1 7/2017 Kohl et al.

FOREIGN PATENT DOCUMENTS

| DE | 102015005759 A1 | 12/2015 |
| DE | 102016005850 A1 | 11/2017 |
| DE | 102018103680 A1 | 8/2019 |
| WO | WO2019158402 A2 | 8/2019 |

OTHER PUBLICATIONS

English Machine Translation of DE 10 2016 005850 (Year: 2017).*
English Machine Translation of DE 10 2010 006404 (Year: 2011).*
English Translation, EP Extended Search Report for EP Application No. 20187041.7 dated Feb. 25, 2021, (7 pages).
EP Extended Search Report for EP Application No. 20187041.7 dated Feb. 25, 2021, (7 pages).

* cited by examiner

BOLT SETTING METHOD OF A NAIL-SHAPED BOLT AS WELL AS A SETTING DEVICE WITH AN ELECTRONIC CONTROL UNIT FOR IMPLEMENTING THE BOLT SETTING METHOD

CROSS REFERENCE TO RELATED APPLICATIONS

This application claims the priority of European patent application No. EP20187041.7, filed on Jul. 21, 2020, and the content of this priority application is incorporated herein by reference in its entirety.

TECHNICAL FIELD

The present disclosure relates to a bolt setting method of a nail-shaped bolt with a head and a shaft extending from there and ending in a tapered manner into at least one component, which may be into a stack of at least two components being arranged upon each other, of metal and/or plastic material, in which the bolt is set into the at least one component nearly rotation-free with a straight-lined setting movement in at least two steps. Furthermore, the present disclosure relates to a bolt setting method of a similar kind, in which the nail-shaped bolt is set into the at least one component or a stack of components in one step. Furthermore, the present disclosure comprises a setting device with which the nail-shaped bolt is set into the at least one component or into the stack of the at least two components arranged upon one another nearly rotation-free with a straight-lined setting movement. The setting device comprises an electronic control unit, which is adapted to the bolt setting method.

BACKGROUND

For connecting at least two components which are arranged in a stack upon each other, for example consisting of metal and/or plastic material, different methods are known in the state of the art. In the so-called flow-form screwing, a screw-like bolt is rotated about its longitudinal axis with a high rotational speed and is at the same time set into the components by means of a linear setting movement. The rotation about the longitudinal axis of the screw-like bolt leads to a softening of the component material. After having set the screw-like bolt into the softened material, the softened material cools down and assumes a shape predetermined by the outer thread shape of the bolt. With this method, which uses a combination of a rotation movement and a straight-lined setting movement, joining speeds of up to 40 m/s are reached.

A differently oriented setting method joins nail-like bolts into a stack of components arranged upon each other by means of a nearly rotation-free straight-lined setting movement. These components, too, can consist of metal and/or plastic material. The nail-like bolts are for example shot into the components with the help of a pneumatically operated setting device, so that joining speeds in the two-digit range are achieved. The connecting quality is good with this bolt setting method and the circle times are short, however, this kind of bolt setting comes along with a partly undesired noise pollution.

In the building industry, there are also similarly designed bolt setting methods. Here, nail-shaped connection bolts are often shot into masonry or other materials with a setting device driven by powder force in order to achieve different connections. High joining speeds are achieved here, too, which result in low circle times of the joining method along with a high noise pollution.

The use of high joining speeds for the effective setting of bolts also has the result that the respective bolt must be brought to the necessary joining speed with the help of a drive. These high joining speeds which, beside a reliable setting of the bolt into the components, also guarantee a reliable connection quality, at the same time lead to relatively high reaction forces on a robot carrying the setting device or on a corresponding delivery or guiding device. Particularly with regard to robots to be used in combination with a setting device, a high stability classification of the robot is expensive and influences the costs of, for example, a production line in the vehicle construction. It is therefore desirable to be able to operate the effective setting devices and the associated connection quality with lower-priced industrial robots, too. Because the setting devices known so far and the joining methods implemented with them cannot be transmitted onto industrial robots of a lower classification in an unchanged manner due to the associated reaction forces.

With regard to the above-mentioned different disadvantages, particularly of setting methods and setting devices with which a nail-shaped bolt is set into a number of components being arranged upon each other nearly rotation fee with a straight-lined setting movement, it is the object of at least some implementations the present disclosure to suggest a bolt setting method which is improved in terms of its effectivity and a setting device adapted to it, which overcomes or at least reduces the above disadvantages.

SUMMARY

The above object is solved by a bolt setting method of a nail-shaped bolt for a nearly rotation-free straight-lined setting of the bolt into at least one component, which may be at least two components arranged upon one another. A similar kind of a bolt setting method for the nail-shaped bolt. Furthermore, the present disclosure includes a setting device in combination with an electronic control unit so that the above-mentioned bolt setting methods can be carried out with the help of the setting device. Advantageous designs and further embodiments of the mentioned bolt setting methods as well as of the setting device result from the dependent claims, the following description as well as the accompanying drawings.

The bolt setting method relates to the setting of a nail-shaped bolt with a head and a shaft extending from there and ending in a tapered manner into at least one component, which may be into a stack of at least two components arranged upon each other, out of metal and/or plastic material, with which the bolt is set into the components nearly rotation-free with a straight-lined setting movement with at least two steps. The bolt setting method includes the following steps: joining the bolt into the at least one component with a deforming stroke during which the bolt reaches a first joining speed of ≤4 m/s and the shaft completely penetrates the at least one component with a portion of a maximum diameter with respect to a shaft length, without a bottom side of the head abutting the at least one component, in particular a component facing the head, and after the deforming stroke, driving the bolt into the components until a head abutment of the bottom side of the head on the at least one component by at least one friction stroke with which a frictional connection between the shaft and the components is overcome and with which the bolt reaches a second joining speed that is smaller than the first joining speed.

The bolt setting method is based on known bolt setting methods with which the nail-shaped bolt is set with a straight-lined setting movement nearly rotation-free with only one stroke with relatively high joining speeds of more than 10 m/s or 20 m/s. Nearly rotation-free setting of the bolt means that a stamp transfers a setting force onto the bolt via a straight movement. In at least some implementations, this setting force is not supported by a torque which is transferred by the stamp onto the bolt. It is known that a torque is specifically combined with a straight-lined movement of the stamp when setting a flow-forming screw and is transferred onto the corresponding bolt. In at least some implementations, of the present method, only one bolt with an outer profiling of the shaft, for example an outer thread or a thread-like shape, is used. During a non-rotating straight-lined setting movement of the stamp, which joins the bolt into the at least one component, an interaction between the component and the profiled shaft of the bolt causes the bolt to rotate.

This known technology may be carried out for the benefit of a reduced noise emission during the setting method as well as a reduced mechanical load of a robot carrying and guiding the setting device with a joining speed in the one-digit range. The joining speed may be limited to a value ≤4 m/s, wherein the bolt that is driven with this deforming stroke may not penetrate into the component which faces the nail head until the head abutment. Rather, the deforming stroke which is carried out as the first step of the bolt setting method serves for using the available kinetic energy, which has been transferred by a driver piston onto the bolt to be driven in, for the deforming of the at least one component or the at least two components during the penetrating of the bolt shaft into the components. The bolt shaft penetrates into the at least one component or the at least two components arranged upon each other so far that a shaft portion of a maximum diameter with respect to the total length of the shaft completely penetrates the at least one component or the components arranged upon each other. As the shaft completely penetrates the component or the components with the portion having the biggest diameter, the penetration opening of the shaft generated in the components and of the connection to be established may be radially extended nearly to the maximum. Thus, the shaft may carry out almost the complete deforming job when penetrating into the at least one component during the deforming stroke. By that, the subsequent friction stroke or generally the completing of the connection is facilitated and significantly reduced in terms of its energy demand compared with the deforming stroke.

The method is adapted to connect a plurality of components arranged upon each other. In the same way, it is also intended for setting the nail-shaped bolt into one component, only. This technical solution may be interesting when a bolt as welding auxiliary joining part is set into a component of non- or hardly weldable material. This provides the possibility to weld the component with the set bolt via the welding auxiliary joining part with a further component of weldable material.

The nail-shaped bolt in form of a functional bolt be set into one component, only. In such a functional bolt, the head may comprise a thread section, a ball head, another connection or coupling structure or another suitable functional portion.

Independent of whether in the following description, the drawings and the claims, the setting of the joining element into only one component or into a stack of at least two components arranged upon each other is described, these descriptions apply similarly to the setting into only one component and to the setting into the stack of at least two components. Furthermore, the below-described setting device with control unit is provided for setting the joining element into one component or into a stack of at least two components.

Subsequently to the deforming stroke, the friction stroke is carried out which drives or may press or punch the bolt into the components arranged upon each other or into the one component until the head abutment of the component which faces the nail head. With the help of this method, a strategy is realized which includes at least two steps. In the first step, the energy consumption which is higher compared with the second step, takes place via the bolt to be driven into the component(s). Because this first energy consumption is used so that the bolt shaft penetrates the components which are arranged upon each other or the one component with its portion having the biggest shaft diameter, without the heading coming into abutment on the component facing the head. For this purpose, the energy consumption which is transferred by the driver piston onto the bolt to be driven in is adjusted in a targeted manner such that the bolt expands the component(s) for the penetrating of the bolt shaft in an optimized way by the deforming stroke, but is decelerated due to the friction between the component or the components and the bolt shaft without head abutment on the component or components facing the nail head and remains plugged there. On the one hand, this method prevents the noise which is caused by the hitting of the bolt head on the component facing the bolt head. Furthermore, the further joining and thus the final establishing of the joining connection between bolt and component or components is prepared by the deforming stroke such that for a further driving-in of the bolt into the component or components arranged upon each other or the component, only the frictional connection between bolt shaft and component/components must be overcome.

As the frictional connection between the components to be connected or the component and the bolt shaft can be overcome with a lower energy demand compared with the deforming stroke, a lower energy consumption into bolt and components takes place within the friction stroke than within the deforming stroke. This friction stroke can also be designated as impressing or subsequently pressing the nail-shaped bolt into the components to be connected or the component. This impressing or subsequent pressing takes places until the bottom side of the bolt head abuts the side of the component which faces it.

Thus, a single stroke of the driver piston for setting the bolt is avoided with the help of this bolt setting method. As a result, besides the high force peaks during the joining method and the associated reaction forces, on for example a robot or delivery appliance carrying the setting device is avoided. With the help of the strategy of the bolt setting method which comprises at least two strokes, the kinetic energy introduced into the joint via the bolt can be adapted more precisely to the energy demand of the joint compared with known bolt setting methods, such as high speed bolt setting methods. In this way, a lower amount of excess energy is delivered to the joint, which would for example be converted into a noise pollution or into a mechanical load of the joint or into unfavourable reaction forces onto a robot that is connected with the setting device.

The bolt may be joined with a driver piston with a driver piston mass, which determines a kinetic energy of the deforming stroke with a first acceleration accelerated to the first joining speed, so that the bottom side of the head is arranged at a distance to the adjacent component due to the deforming stroke alone.

The deforming stroke which starts the bolt setting method may be adjusted in terms of its kinetic energy such that the bolt shaft remains plugged in the components to be connected or in the component, without an abutment of the head on the adjacent component being achieved. Accordingly, it is necessary that the kinetic energy which is transferred by the accelerated driver piston of a used setting device in combination with a driver piston mass is chosen lower as regards quantity than would be necessary for reaching a bolt head abutment.

In order to determine the displacement effort of the bolt shaft which penetrates into components which may be arranged upon each other and are to be connected or into one component, only, different joining attempts with differently high kinetic energy consumptions of the bolt are made. If, for example, several similar bolts are set into the components to be connected or a corresponding combination of component material and/or component geometry with differently high kinetic energy consumptions, it can be recognized based on the insertion depth of the bolt and the associated head projection over the component facing the head, with which kinetic amount of energy the deforming stroke can be carried out in a suitable manner. The setting forces used for the setting, the component material, the component geometry as for example the component thickness, the bolt geometry as for example shaft diameter, shaft length, shaft profile depth, shaft profile shape may be collected as joining parameter specific data. These pre-attempts may serve for generating a characteristic diagram which may be stored or saved in a control unit of the setting device. This characteristic diagram may indicate at which joining speed of the driver piston with or without driver piston mass which head projection of the bolt is achieved. Analogously to that, the indication of the kinetic energy of the driver piston with or without driver piston mass is with which a specific head projection of the bolt may be achieved. This data which is stored in the characteristic table or characteristic diagram as a whole or as a selection is also referred to as joining parameter specific data.

It may also be gathered from this characteristic diagram which amount of kinetic energy has yet to be supplied to the bolt via the driver piston in order to join the bolt until head abutment into the components to be connected or the one component. It is assumed that the above-mentioned kinetic energy which is necessary for the joining process is displayable by a joining speed to be adjusted at the driver piston or by a setting force of the driver piston to be applied. It is to be understood that in this characteristic diagram, it must be stored which component materials with which component thickness and with which bolt geometry are joined (see above) in order to be able to clearly assign the indicated values. Additionally, a limited number of pre-attempts is carried out. This joining parameter specific data which arises as a result from these pre-attempts may be interpolated and/or extrapolated. In this way, an assessment of joining parameter specific data is obtained which has not explicitly been tested in the pre-attempts. Joining parameter specific data for example non-examined component thicknesses or shaft diameters or component tensile strengths may be derived from this characteristic diagram.

According to a further design of the bolt setting method, the driver piston may be arranged in a dampening, spring-pretensioned manner against a robot hand or a delivery device of the setting device and the driver piston is driven with a linear drive in the form of a servo linear motor, an hydraulic cylinder, a pneumatic cylinder or a servo motor with transmission element, whereas during the straight-lined setting movement of the non-rotating driver piston, at least one of the following sizes may be determined: a path, a speed, a force of the driver piston.

During the deforming stroke, the nail-shaped bolt is accelerated to a higher joining speed than during the friction stroke. In order to bring the driver piston with its driver piston mass to the joining speed necessary for the deforming stroke, the used linear drive must generate the suitable acceleration depending on the available acceleration path for the driver piston. The amount of acceleration is, however, at the same time decisive for the reaction force, which has an influence on the delivery appliance or a robot which moves the setting device to the joining position. In order to keep this reaction force as low as possible, which would for example have an advantageous impact with regard to the stability to be made available by the robot carrying the setting device, the acceleration path of the driver piston may be adjustable in its length and selectable as big as possible. Furthermore, the driver piston and the overall linear drive may be arranged in a spring-dampened manner against the robot or a delivery appliance. This spring-dampened arrangement converts at least a part of the energy that is transferred by the reaction force onto a robot or the delivery appliance into deforming energy or friction of the dampening device or it temporally decelerates the effect of the reaction force. In this way, the mechanical loads of the robot or the delivery appliance are reduced and/or at least controlled in a better manner than without dampening device.

Regarding the control of the bolt setting method, the straight setting movement of the driver piston is supervised with the help of a suitable sensor technology. For this purpose, a way or path sensor, for example, identifies the way or path made by the driver piston during the setting movement. The speed of the driver piston during the setting movement may be identified with the help of a speed sensor or that the speed from the identified way signal depending on the time may be determined. According to a further design, the force applied onto the bolt by the driver piston may be identified with the help of a force sensor and is transferred to an electronic control unit. The control and operating data of the linear drive of the setting device, which may be realized as a servo motor, be identified and assessed in order to determine the way made by the driver piston and/or the force applied by the driver piston. With the help of this electronic control unit, it is possible to supervise the proceeding joining method in real time, i.e. in situ and to intervene into the setting method depending on the assessed data.

According to a further embodiment of the bolt setting method, the driver piston, driven by the linear drive, may be accelerated to the first joining speed, an encountering of the driver piston on the bolt is recorded, by assessing a way signal of the driver piston depending on the time and subsequently, the driving of the driver piston may be switched off.

According to the above-described sensor technology for supervising and controlling the bolt setting method and/or according to the above-described assessment of the operating data of the linear drive, the way made by the driver piston during the deforming stroke may be identified. Based on the way made by the driver piston in dependence of the time, it can be recognized when the driver piston encounters the bolt in order to transfer the kinetic energy of the driver piston onto the bolt.

While the driver piston has been driven by the linear drive until encountering the bolt, a further driving of the bolt may be stopped by the linear drive at the moment of encountering of the driver piston on the bolt. Because the kinetic energy that is transferred by the driver piston onto the bolt may be adjusted such that it is sufficient for the necessary work of deformation of the bolt shaft in the components to be connected or in one component. This may be determined by the joining speed which is adjusted depending on driver piston and driver piston mass. Accordingly, the shaft portion having the largest diameter with regard to the shaft length completely penetrates through the components to be connected or the component and furthermore, the bolt remains plugged in the components to be connected or the component with a head projection.

The inertia of the driver piston mass and the kinetic energy which is transferred onto the driver piston thus ensure that the deforming stroke is carried out. If, however, the bolt setting method is carried out with a setting device in the overhead operation, the gravity could have a decelerating effect on the driver piston with its driver piston mass. In this case, the driver piston may be accelerated up to the point that the decelerating gravity is compensated. This approach may guarantee that the amount of kinetic energy that is introduced into the deforming stroke via the joining speed is not influenced by an unfavourable positioning of an executing setting device in the room, i.e. by a working or operating position of the setting device in the room.

According to a further embodiment of the bolt setting method, the bolt may be decelerated during the deforming stroke by work of deformation of the bolt during a penetrating of the shaft into the at least one component to a penetration speed of the shaft through the component or the components, which may be ≤85% of the first joining speed of the deforming stroke and another driving of the driver piston with the linear drive with the second joining speed takes place in the friction stroke that is smaller than or equal to the penetration speed.

According to a further embodiment of the bolt setting method, the deforming stroke is not carried out until the bolt comes to a rest and remains plugged in the components to be connected or the component. Instead, the initially used joining speed of the bolt in the deforming stroke may be decelerated to the penetration speed of the bolt through the component(s). This penetration speed shows how fast the bolt can further be pressed into the component(s) after work of deformation has taken place in the components to be connected or the component until head abutment. Thus, the penetration speed emphasizes with which speed the friction stroke can be carried out in order to be able to establish a complete joining connection with the bolt setting method.

In this connection, it is however not absolutely necessary that the second joining speed of the friction stroke corresponds to the penetration speed in terms of its height. Rather, the course of proceeding may show that the deforming stroke and the friction stroke may merge wherein the sliding friction, that is available from the deforming stroke, between bolt shaft and components may be used advantageously in the friction stroke. This smooth transition between deforming stroke and friction stroke may support short cycle times for establishing the connection.

A further optional strategy is to firstly wait for the standstill of the bolt after the deforming stroke in order to then overcome the static friction between component and bolt with the subsequent friction stroke and to establish the connection completely.

According to a further design of the bolt setting method, it may comprise the further step of detecting the head abutment of the bolt during the friction stroke by assessing the way and/or speed of the driver piston and the finishing of the driving of the driver piston in the friction stroke.

The termination of the bolt setting method may be recognized with the help of the assessment of the way signal and/or the speed signal of the driver piston. Because as soon as the bolt has been inserted completely into the component or the components to be connected with each other, the driver piston does not continue to move in the joining direction within the scope of the measurement tolerances. Furthermore, the speed of the driver piston considerably drops which is a signal for the end of the setting process. Based on this assessment of the way signal and/or the speed signal of the driver piston, the driving of the driver piston is terminated. The driver piston may be moved back into its initial position after termination of the friction stroke.

According to a further design of the bolt setting method, firstly, the bolt may be completely decelerated during the deforming stroke by work of deformation in the component or the components, subsequently, the removing of the driver piston from the bolt into a retreat position and the accelerating of the driver piston from the retreat position to a third joining speed takes place, with which in the friction stroke, the driver piston drives the bolt for reaching the head abutment and which may be ≤85% of the first joining speed, and the switching-off of the driving of the driver piston after recorded encountering of the driver piston on the bolt.

According to the above-mentioned design, it is first of all waited until the deforming stroke is concluded and the bolt does no longer move in the joining direction. The necessary energy demand may be determined, corresponding to the insertion depth of the bolt reached at this point in time, which may be determined based on the head projection of the bolt in the component facing the head in order to be able to completely establish the joining connection. The head projection refers to the distance between the head bottom side of the bolt and the component surface facing the head.

In order to be able to carry out the concluding friction stroke, the driver piston may be accelerated from a retreat position to the necessary third joining speed and the associated kinetic energy of the driver piston. This kinetic energy is transferred onto the bolt when the driver piston hits the same, so that it overcomes the frictional connection between shaft and component/components. Furthermore, the energy which is transferred onto the bolt serves for setting the bolt into the components to be connected or the component until the head abutment. As, based on the way signal of the driver piston and/or the speed signal of the driver piston, it can be recognized that the joining process has been concluded, a further driving of the driver piston is finished.

As already mentioned above, the following may be carried out as a further step according to a further design of the bolt setting method: determining a head projection of the bolt after termination of the deforming stroke and determining the third joining speed of the driver piston based on the head projection, which may be based on a joining parameter specific characteristic table for joining speeds depending on the head projection.

Furthermore, the present disclosure comprises a further bolt setting method of a nail shaped bolt with a head and a shaft extending from there and ending in a tempered manner into at least one component, which may be into a stack of at least two components arranged upon each other, out of metal and/or plastic material, during which method the bolt is set into the components nearly rotation-free with a straight-lined setting movement. The bolt setting method includes the following steps: joining the bolt into the at least one component with a deforming stroke during which the bolt reaches a first joining speed of ≤4 m/s and the shaft completely penetrates the components with a portion of a maximum diameter with respect to a shaft length, and decelerating the bolt by work of deformation of the bolt during a penetrating of the shaft into the at least one component until a bottom side of the head abuts a component facing the head.

In the course of this alternative of the bolt setting method, the deforming stroke is adjusted with respect to its energy consumption into or onto the bolt to be set such that with the deforming stroke alone, the bolt is joined into the components to be connected with each other or the component until the head abutment. In this connection, it is of significance that the joining speed of the deforming stroke is adjusted as low that the noise pollution of bolts which are joined with only one stroke is avoided. Because it may be the targeted choice of the joining speed and thus of the energy amount of kinetic energy, which is impressed into the bolt by the driver piston, which may be chosen so low that, no excess energy of the bolt may be converted into an unnecessary noise pollution of the environment. Therefore, the kinetic energy used during the deforming stroke is just enough to perform the necessary work of deformation of the bolt shaft and at the same time to still guarantee the penetrating of the bolt until the head abutment.

The present disclosure furthermore includes a setting device for realizing the above-described bolt setting method according to its different embodiments. The setting device, with which the nail-shaped bolt can be set nearly rotation free with a straight-lined setting movement into a stack of at least two components arranged upon each other or into only one component with at least two steps, includes the following features: a driver piston with a driver mass, being driven by a linear drive and moved in a straight-lined, rotation free manner, wherein the bolt is set with the driver piston, a slider on which the linear drive with the driver piston is arranged, wherein the slider is movable against a dampening device, in particular in a fastening at a robot hand of an industrial robot or a delivery device, and an electronic control unit which is adapted to control the setting device according to the bolt setting method according to one of the preceding claims.

The setting device is characterized by the fact that the used linear drive drives the nail-shaped bolt into the components to be connected in a straight-lined and nearly rotation-free manner with the help of the driver piston. In order to keep a possible reaction force of the setting device onto the connected robot or a delivery appliance as low as possible, the linear drive is arranged on a slider. This slider guarantees a compensation movement contrary to the joining movement of the linear drive. Furthermore, the slider may be spring-pretensioned against the fastening at a robot hand of an industrial robot or against a used delivery appliance for the setting device.

It may be that not only different joining speeds of the driver piston are adjustable with the help of the electronic control unit of the setting device. Rather, a certain distance, the so-called acceleration path of the driver piston, may be available to the linear drive in order to accelerate the driver piston with its driver piston mass to the necessary joining speed. The shorter the acceleration path of the linear drive for the driver piston with the same joining speed to be adjusted, the higher the driver acceleration must be in order to achieve the desired joining speed. However, with an increasing driver acceleration, the reaction force onto the delivery appliance connected with the setting device or onto the connected robot increases as well. As this reaction force should be kept as low as possible, the associated reaction forces may be kept low or should be reduced with the help of a specific choice of the length of the acceleration path. Thus, the low joining speeds of ≤4 m/s in the deforming stroke as well as a selected choice of an acceleration path which may be as long as possible can be exploited in order to reduce the load of an associated delivery appliance or a robot.

The setting device may include different constructive embodiment alternatives. According to a first embodiment, the driver piston with a first joining speed may be movable with a first joining speed of ≤4 m/s and a bolt is thus settable.

According to a further embodiment of the setting device, the driver piston may be accelerable to a predetermined joining speed over a length of a predetermined acceleration path, wherein a reaction force onto a delivery appliance carrying the setting device or onto a robot is adjustable by a size of the joining speed and/or the length of the acceleration path of the driver piston.

According to another embodiment of the setting device, the linear drive may be a servo linear motor, a hydraulic cylinder, a pneumatic cylinder or a servo motor with transmission element. These different constructive alternatives of the servo linear drive have the advantage that from the gathered operating data of the servo linear drive, data such as driver way and applied driver force or joining force can be determined. With regard to a pneumatic cylinder or a hydraulic cylinder, sensors are used for detecting these data.

The setting device may comprise at least one sensor at the driver piston in order to determine a path, a speed and/or a force of the driver piston. In this connection, the sensor does not have to be arranged directly at or on the driver piston. Because the data to be determined, such as path, speed and/or force, can also be derived from the drive data of the linear drive. Accordingly, the objective presence of the sensor is not decisive but rather, the functional design of the setting device to specifically determine or detect such data and to transfer them to the control unit. Furthermore, the electronic control unit detects the joining method in situ and may control the joining method due to the detected data.

BRIEF DESCRIPTION OF THE DRAWINGS

The embodiments of the present disclosure are described in more detail under reference to the accompanying drawings, showing.

DETAILED DESCRIPTION

Figure 1:
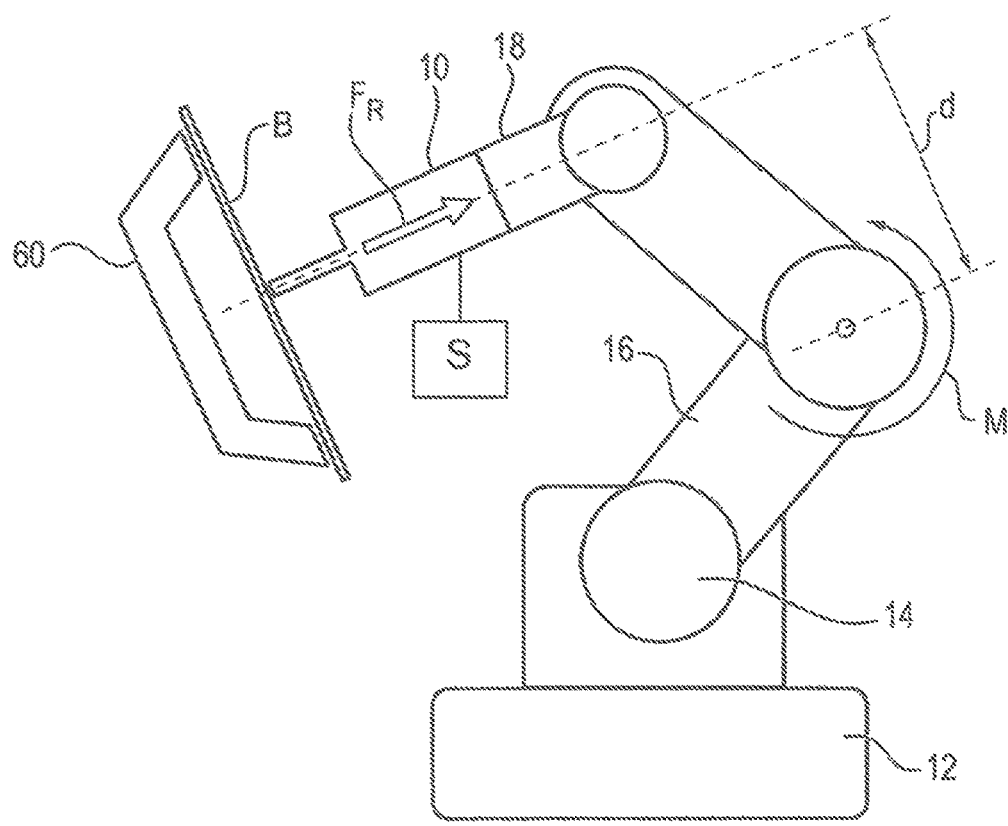
FIG. 1 a schematic illustration of components of a robot cell including an industrial robot with a setting device with linear drive of the stamp and an electronic control unit, FIG. 2 a schematic illustration of the industrial robot with an embodiment of the setting device with a pneumatic linear drive of the stamp and the electronic control unit, FIG. 3 a schematic illustration of the industrial robot with a further embodiment of the setting device, a similarly pneumatic linear drive of the stamp and the electronic control unit, FIG. 4 a schematic illustration of the industrial robot with a further embodiment of the setting device with a spindle drive as linear drive of the stamp and the electronic control unit, FIG. 5 a schematic illustration of the industrial robot with a further embodiment of the setting device with a linear motor as linear drive of the stamp and the electronic control unit, FIG. 6 a schematic illustration of the linear motor with driver mass and setting head in two views, FIG. 7a a schematic illustration of the two phases of the joining process when setting a nail-shaped joining element into one component only, FIG. 7b a schematic illustration of the two phases of the joining process when setting a nail-shaped joining element into at least two components arranged upon each other, FIG. 8 a schematic joining diagram for illustrating the operating phases of an embodiment of the joining method, in which the change of the joining force of the stamp, the path of the stamp and the speed of the stamp are illustrated in dependency of the time, FIG. 9 a flow diagram of an embodiment of the bolt setting method according to FIG. 8, FIG. 10 a schematic joining diagram for illustrating the operating phases of a further embodiment of the joining method in which the change of the joining force of the stamp, of the path of the stamp and of the speed of the stamp are illustrated in dependency of the time, and FIG. 11 a flow chart of a further embodiment of the bolt setting method according to FIG. 10.

FIGS. 1-5 show different schematic illustrations of robot cells, that means a working area of an industrial robot R in combination with a setting device 10 which is or which are supervised and/or controlled by an electronic control unit S. An industrial robot R is a universally usable automata capable of movement having several axes, the movements of which are freely programmable and, if need be, guided by sensor with regard to movement sequence and ways or angles. The industrial robot R is equipped with the setting device 10 with control unit S.

Depending on the task to be executed, the industrial robot R is constructed and configured in different ways. Such industrial robots R are generally known and are used in the most different application areas. Depending on the kinematic of the industrial robot, the industrial robots R are divided into different groups. The industrial robots of the group with parallel kinematic include delta robots with three rotation axes fixedly mounted to the rack as well as hexapod robots with six linear axes. Furthermore, there are industrial robots R with serial kinematic. This group includes robots with articulated arm having 5- and 6-axes robots with five or six rotation axes, respectively, 7-axes robots with seven axes, dual arm robots with 15 axes as well as scara robots with three parallel rotation axes and one linear axis. The above examples serve for the illustration regarding the group of the known industrial robots R which are usable variably in combination with the setting device 10 with control unit S.

Independent of the processing device which may be fastened at the industrial robot R, in the present case the setting device 10, the industrial robots R are characterized by means of the parameter load capacity. The load capacity describes the maximum mass which can be fastened to the end of the manipulator, i.e. to the functional end of the industrial robot. Known industrial robots R, as for example robots with articulated arm, are characterized by a load capacity in the range of 2.5 to 1,300 kg.

In FIGS. 1-5, the industrial robot R comprises, besides a fastening foot 12, two exemplary robot arms 16 which are connected with each other via rotational axes 14. Furthermore, a functional end 18 is provided at which the setting device 10 is arranged. The setting device 10 is connected with the electronic control unit S.

The electronic control unit S is connected with the setting device 10 in a wireless or physical manner. The bolt setting method which is described in more detail below is stored in the control unit S as an executable software programme. Thus, the different constructive embodiments of the setting device 10 may be controlled and supervised specifically with the help of the control unit S. The control unit S may consist of an industrial computer with at least one processor and a memory. The bolt setting method may be stored in the memory as an executable software programme and is executable with the help of the processor.

The control unit S controls and/or supervises the movement of the robot R or of a delivery unit (not shown) which may be usable as an alternative to the robot R. In this way, the setting device 10 and the robot R or the delivery unit are moved in a coordinated manner with respect to each other.

Figure 7:
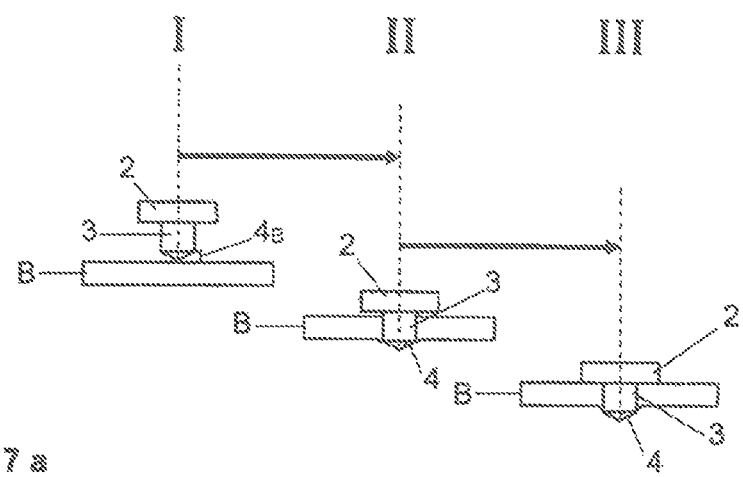
Figure 7:
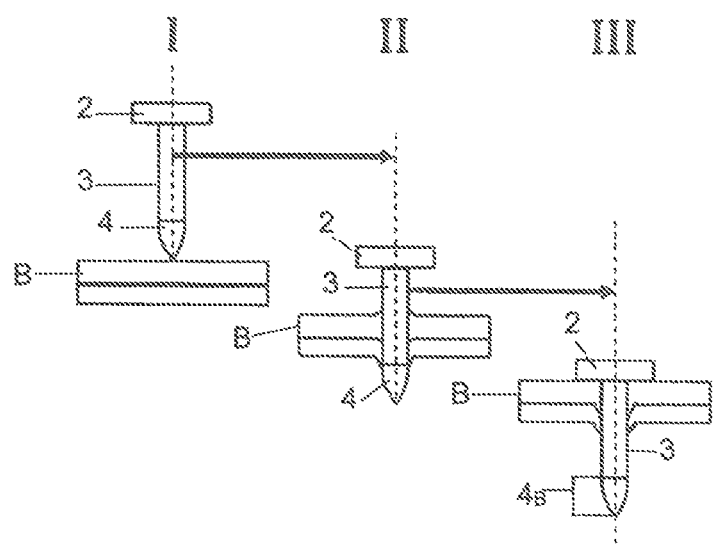

A nail-shaped bolt 20 is set into at least one component B with the setting device 10 via a driver piston 30 (see FIG. 1). The bolt 20 may be a joining element for connecting at least two components being arranged upon each other in a stack-like manner. This is schematically illustrated in FIG. 7b. According to a further embodiment, the bolt 20 may be an auxiliary welding joining part (see above) which is placed into at least one component according to FIG. 7a. The bolt 20 may be a functional bolt of the kind that has been described above. For setting the nail-shaped bolt 20, the driver piston 30 exerts a linearly acting joining force which presses or shoots the bolt 20 into the at least one component B. In accordance with the joining force, the setting device 10 generates a processing impulse onto the bolt 20. As the bolt 20 is set nearly rotation-free, i.e. without a targeted transmission of a torque onto the bolt, the setting device 10 does not generate any rotation impulse in the bolt 20 which can influence the establishing of a connection.

The processing impulse which is generated by the setting device 10 with or without basic dampening module, correspondingly causes a reaction force which gives feedback to the industrial robot R.

Figure 2:
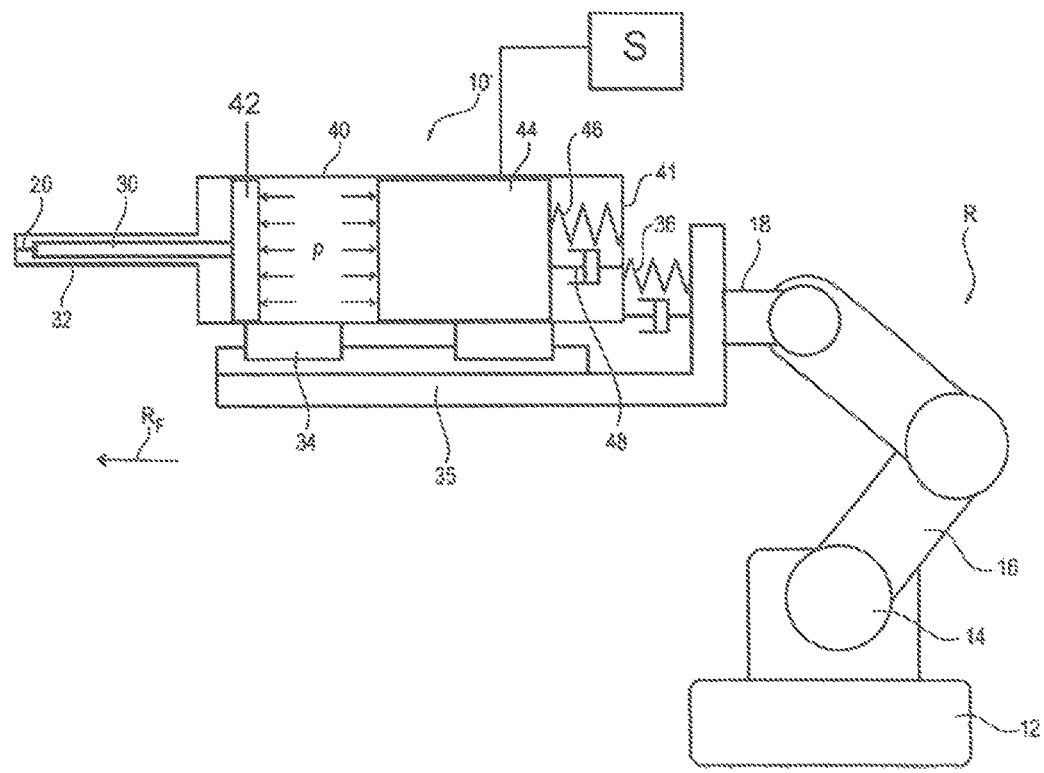

With the help of the setting device according to FIG. 2, the bolt 20 may be moved to a defined joining position by a movement of the industrial robot R and is set there. For this purpose, the setting device 10, which is fastened at a functional end 18, includes the driver piston 30 which rests against a functional end 18 via a linear drive 40. A downholder 32 may enclose the driver piston 30 in a linearly movable manner. The downholder 32 is supported on a guide 34 in a slidable manner. A downholder spring 36 generates a spring pretension in the joining direction RF.

FIG. 2 shows an embodiment of the setting device 10 with a pneumatic cylinder 40. A stamp force of the driver piston 30 may be generated via a pneumatic piston 42. A movable mass 44 may be arranged in the pneumatic cylinder 40. The mass 44 rests against a rear wall 41 of the pneumatic cylinder 40 via a spring 46 in a springing manner. In addition, the mass 44 may be arranged in a dampened manner via a dampener 48 against the rear wall 41. The piston 42 is pressed against the driver piston 30 and thus against the nail-shaped bolt 20 by means of pressurization P in the joining direction RF and the driver piston 30 sets the bolt 20 into the at least one component (not shown). For this purpose, a pneumatic pressure chamber of the linear drive 40 is located between the piston 42 and the mass 44.

Figure 3:
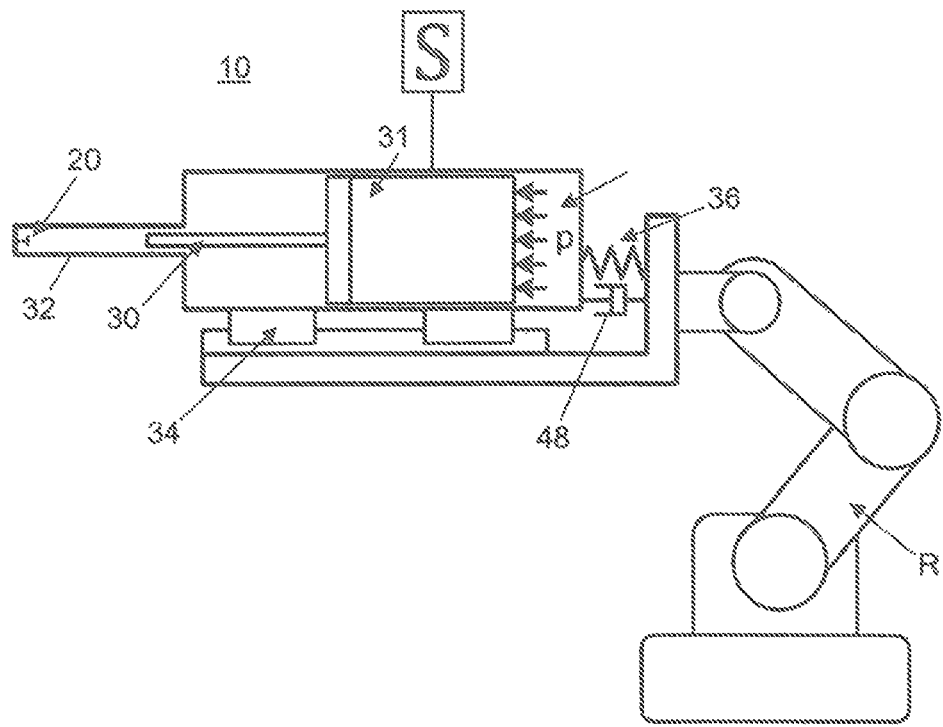

A further embodiment of the setting device 10 is shown in FIG. 3. In this embodiment, the bolt 20 is also accelerated to a joining speed via the driver piston 30 and is thus set into the at least one component. The linear drive of the setting device 10 is a pneumatic cylinder in which the driver piston 30 is connected with a driver mass 31. The pressure chamber for moving the driver piston 30 is arranged in the joining direction RF in front of the driver mass 31. The linear drive 40, namely the pneumatic cylinder, is arranged on the guide 34 as a slider for a linear compensation movement. In addition, the linear drive 40 is supported in a dampened manner via a spring 36 against the robot R in the same way as in FIG. 2.

Figure 4:
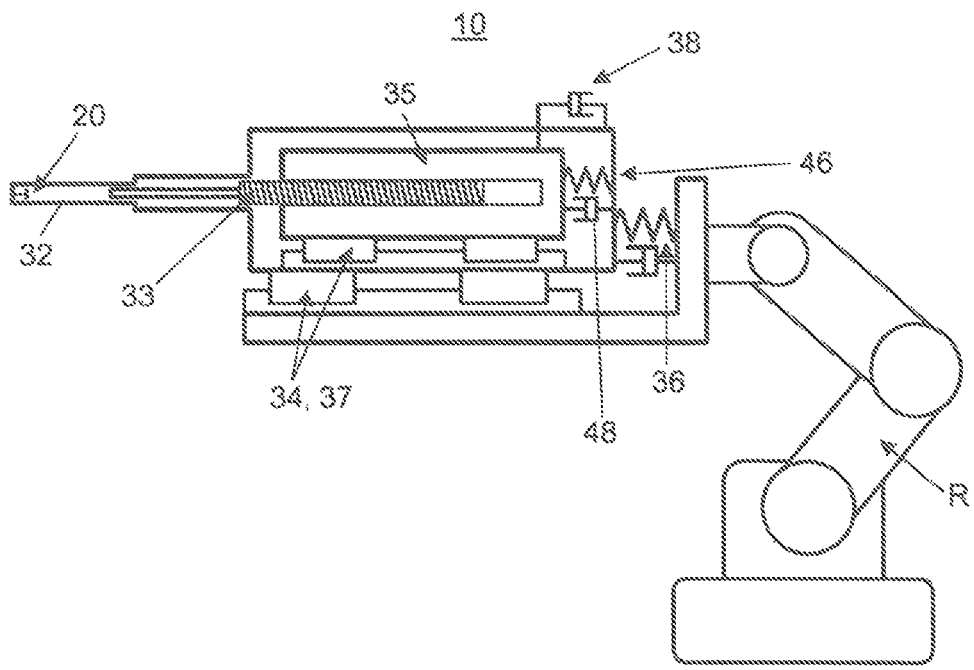

A further design of the setting device 10 is schematically shown in FIG. 4. The driver piston 30, which sets the bolt 20 with a defined joining speed, may be moved by a spindle 33 with a spindle drive 35. The spindle drive 35 and the spindle 33 form the linear drive 40 of the setting device 10 in order to set the bolt 20 in a rotation-free manner.

The spindle drive 35 may be connected with a return stroke dampening mass, which has the same function as the driver mass 31 of the setting device 10 in FIG. 2.

The linear drive 33, 35 is arranged as a slider on a guide 37 and spring-pretensioned against the robot R. A return stroke dampener 38 may only act in the direction of the reaction force of the linear drive upon the robot R and may dampen this reaction force or at least delays it.

The linear drive 33, 35 is surrounded by a downholder. The downholder is shiftable linearly on the guides 34 or contrary to the joining direction RF and supported in a dampened manner via the spring 36 at the robot R (see FIG. 2).

Figure 5:
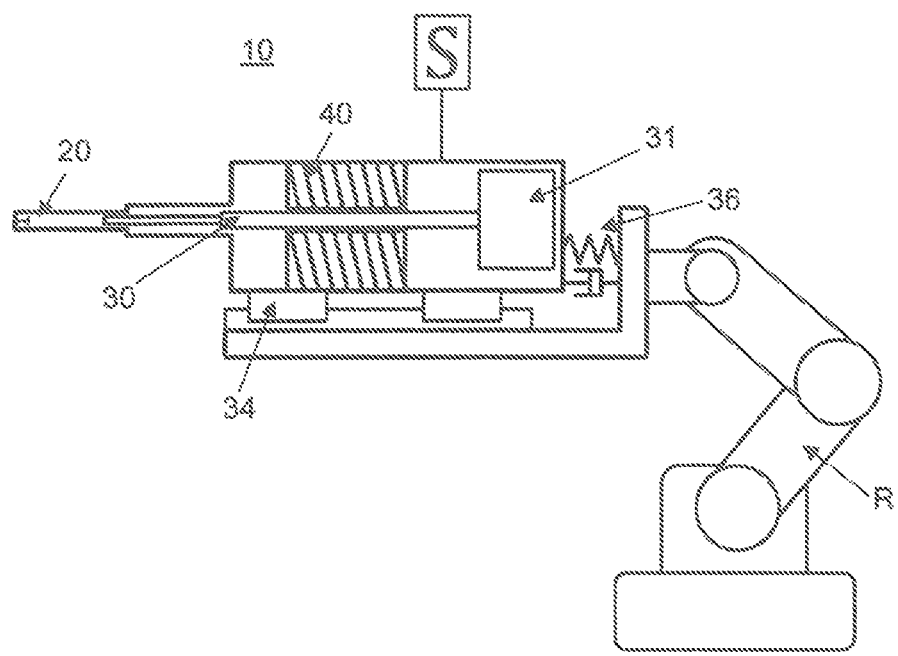

The design of the setting device 10 according to FIG. 5 may move the driver piston 30 with driver mass 31 with a linear motor 40 as linear drive. The linear drive 40 is configured as a servo motor in the same way as the spindle drive so that a motor current as well as a linear movement of the spindle drive are detectable via the rotation number of the linear motor and a thread pitch of the spindle is detectable by means of a motor control or sensorially and are processable in the control unit S.

The linear drive 40 which is configured as linear motor is also movably arranged as a slider on the guides 34 and spring-pretensioned against the robot R.

Figure 6:
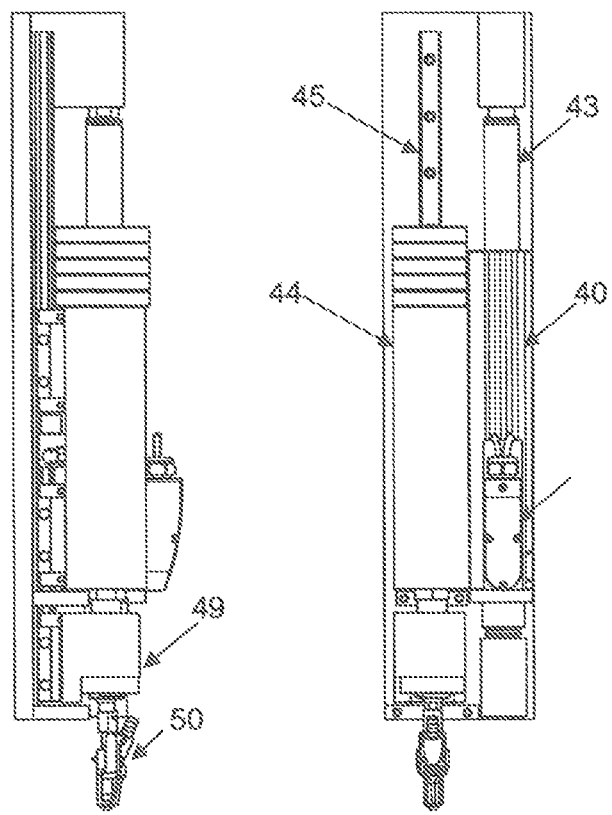

FIG. 6 shows an embodiment of the linear motor 40 of the setting device 10 of FIG. 5. The linear motor 40 linearly moves a magnet bar 43. The magnet bar 43 is connected with a driver mass 44 on a guide 45. A converter 47 supports the electric control and supply of the linear motor 40. In order to detect the way or path of the driver piston 30, a way or path sensor 49 is provided. It transfers the detected data to the control unit S. Furthermore, the linear drive 40 may include a setting head 50. A bolt 20 to be set is fed or arranged, respectively, by the setting head 50 in the joining direction RF in front of the driver piston 30.

The different above-described embodiments of the setting device 10 are each connected with the control unit S designated for them. The control unit S together with the setting device 10 carry out the bolt setting method which is described in the following. For this purpose, the way of the driver piston 30 is detected by means of a way sensor or the respectively used linear drive 40 and is transferred to the control unit S. Furthermore, with the help of a force sensor or by means of the current that is used by the linear drive 40 in case of a servo motor, it can be detected which force is applied on the bolt 20 by the driver piston 30.

With reference to the schematic illustrations in FIGS. 7a and 7b, the embodiments of the bolt setting method are described in the following. This bolt setting method serves for the joining of a nail-shaped bolt N. The nail-shaped bolt 20 comprises a head 2 and a shaft 3 extending from the bottom side of the head 2. The shaft 3 tapers at its end which faces away from the head within a tip portion $4_B$ extending in longitudinal direction to a tip 4 or a tip-like configuration of the shaft 3. Accordingly, the shaft 3 may include a pointed, an obtuse, a flattened, a rounded or any otherwise shaped tip 4.

The shaft 3 includes a shaft length between the bottom side of the head 2 and the tip 4. The shaft 3 has a nearly constant diameter along its shaft length and up to the beginning of the tip portion $4_B$.

In this connection, it may be assumed that also in the portion of a surface profiling of the shaft 3, the diameter of the shaft 3 varies in a negligibly small manner only and can therefore be assumed to be nearly constant. In this connection, a change of diameter in the longitudinal extension of the shaft 3 is compared with the diameter change in the tip portion $4_B$. If a diameter change in a profiling of the shaft 3 is significantly smaller than in the tip portion, which may be only 75% of it, this diameter variation is assumed to be negligible. Thus, a profiling of the shaft 3 for example generates a diameter change of about 0.1 mm with a shaft diameter of nearly ≤3.5 to 4 mm. Compared to that, the shaft 3 tapers in the tip portion $4_B$ to nearly 0.3 to 0.5 mm.

In this connection, a negligible diameter variation of the shaft 3 may be estimated as follows. The profiling of the shaft 3 is described with a double profile depth tp (double notch depth). This assumption seems to be suitable for example when the profiling of the shaft 3 is formed by a thread portion. The quotient is now calculated based on the double profile depth p (double notch depth) and the maximum shaft diameter ds (diameter of the shaft 3 at the thickest point). When the diameter variation of the shaft 4 in the profiled portion, i.e. outside of the shaft portion $4_B$, fulfil the following relation, then, the variation of the shaft diameter outside of the shaft portion $4_B$ is negligible: 0.01≤tp/ds≤0.65. Thus, profile depths in the range of 0.05 mm≤tp≤1.3 mm with a shaft diameter in the range of 2.0 mm≤ds≤5.0 mm are for example negligible.

The tip portion $4_B$ of the shaft is characterized in that the diameter of the shaft 3 reduces with decreasing distance to the tip 4 without reaching its maximum value again.

In a first phase of the bolt setting method, the shaft 3 penetrates the at least two components B or the only one component B with the tip portion $4_B$ ahead, until the shaft 3 has completely penetrated the at least two components B or the only one component B with a portion of maximum diameter. This can be seen based on the steps I and II illustrated in FIGS. 7a and 7b. Because after completion of step II, the tip portion $4_B$ has completely penetrated the two components B. Accordingly, the shaft 3 has completely passed the one component B or both components B with its maximum diameter portion and has thereby expanded the component opening generated during the joining in accordance with the maximum shaft diameter.

Joining energy which has been transferred onto the bolt 20 by the driver piston 30 in a first step is so high that the shaft 3 penetrates into the component B or the components B in a way that it may radially expand the joining opening to a maximum. Therefore, this first method step is referred to as deforming stroke. In this connection, the shaft 3 enters without an abutment of the head bottom side on the adjacent component B. Accordingly, the bolt 20 remains plugged in the component B or the components B with a head projection regarding the component B facing the head.

Thus, the deforming stroke may carry out the maximum work of deformation with the help of the shaft 3 when generating the joining opening. Thus, no or only a negligibly low work of deformation in the component B or the components B is necessary for the further penetrating of the bolt 20 until the head abutment, e.g. by an above-discussed profiling of the shaft 3, as well as an overcoming of the friction connection between the components B and the shaft 3.

After the deforming stroke, the bolt 20 is driven in with at least one friction stroke until the abutment of the head bottom side on the adjacent component B. Friction stroke thus means that the bolt 20 which is stuck in the component B or the components B is fed with a further amount of energy via the driver piston 30, with the help of which the driver piston 30 may press the bolt 20 completely into the component B or the components B, until the head abutment. As the work of deformation of the shaft 3 has already been concluded, the bolt 20 only has to overcome the existing friction connection at the limiting face or interface between the shaft 3 and the component B or the components to be connected with each other with the friction stroke, until the head bottom side abuts the component facing the head. If for this purpose, after the deforming stroke without standstill, the bolt 20 is further moved or inserted into the component (s), respectively, by the friction stroke, only the acting sliding friction between shaft 3 and components B is yet to be overcome. If the bolt 20 is moved into a further setting movement from resting, the energy which is supplied by the friction stroke must be high enough to overcome the static friction first and then the sliding friction between shaft 3 and components B.

Only one friction stroke may be necessary for the concluding establishing of the connection, that means for the joining of the bolt 20 until head abutment. Compared with the deforming stroke, the friction stroke transfers a smaller energy amount onto the bolt N. Accordingly, a joining speed in the deforming stroke is bigger than in the friction stroke.

The friction stroke is illustrated in FIGS. 7a and 7b based on the transfer from step II to step III. In order to start off the friction stroke, that means in order to feed a further energy amount to the bolt 20 for establishing the joining connection between bolt 20 and component B, it is not absolutely necessary that the bolt 20 is at rest and does no longer move in the joining direction RF. Accordingly, the friction stroke can follow the deforming stroke, even when the bolt 20 is still moving.

As the head bottom side may rest on the head-facing component B with low or negligibly small excess energy of the bolt 20, the noise emission during the joining method is relatively low compared with known joining methods. This may be due to low joining speeds of the bolt N, in comparison with known joining methods. Because these low joining speeds compared with the state of the art result in a negligibly low excess energy with which the bottom side of the head 2 of the bolt 20 rests on the component B facing the head.

In order to supply the bolt 20 with energy in the deforming stroke and in the friction stroke, the driver piston 30 may be accelerated in combination with a driver mass 31 to a joining speed. The linear motor 40 which may be used for this purpose is controlled by the control unit S. During the control of the linear motor 40, the way s of the driver piston 30 as well as a current consumption by the linear motor 40 or an equivalent size in case of a driving pneumatic cylinder or hydraulic cylinder or a spindle drive may be detected by the control unit S.

Due to the above-described embodiment of the setting device 10, the driver piston 30 may be accelerated in combination with the driver piston mass 31. In order to avoid an excess energy and thus a noise-intensive encountering of the bolt head 2 on the component B in the deforming stroke, a joining speed of the bolt 20 of $\leq 4$ m/s, or $\leq 2$ to 3 m/s or $\leq 1$ m/s may be used in the deforming stroke.

The joining speed of the bolt 20 which may be used in the friction stroke may lay under the joining speed of the deforming stroke.

Compared with known high speed bolt setting methods in which joining speeds of more than 5 m/s and up to 40 m/s are used, the significantly lower joining speeds in the deforming stroke and in the friction stroke result in lower reaction forces on the robot R which guides the setting device 10 or on a corresponding feeding device. The reaction force on the robot R or the feeding device depends on an acceleration of the driver piston 30 with driver mass 31, which must be accelerated to the joining speed. If the joining speed is lower than that of the known methods, the reaction force may be lower as a result. Furthermore, the spring dampening systems between robot R and setting device 10 cause the reaction force on the robot R or the feeding device to being dampened and/or delayed.

When using the linear motor or the spindle drive or the pneumatic cylinder as linear drive 40, the acceleration path of the driver piston 30 may be chosen long. The longer the acceleration path of the driver piston 30, the smaller the acceleration of the driver piston 30 is for reaching the joining speed and thus also the reaction force on the robot R resulting therefrom.

The size of the acceleration may be reduced by an enlarged acceleration time, with the acceleration time however being limited by the available acceleration path of the linear drive 40.

A first method alternative of the bolt setting method is described with reference to FIGS. 8 and 9. It is to be understood that the subsequent description of the method applies in the same way to the setting of a bolt 20 into one component only as into a stack of at least two components B.

In order to stipulate the overall necessary energy content of the joining connection, it is appropriate that joining attempts be made in advance. Alternatively, the rigidity of the connection point and thus the flexibility of the material pairing to be joined can be determined. For the determining, a calibration drive without joining element is carried out. In this connection, a mouth piece of the setting device 10 is put onto the components B to be connected and the driver piston 30 is driven against the components B in a slow and controlled manner by exciting force so that the components are moved out. The force which is applied by the setting device 10 and the moving-out of the components B reached by the applied force are recorded so that a characteristic flexibility diagram of the joining point arises. A default setting of the initial joining energy is derived from this characteristic in phase I.

Beside the above-described calibration drive, the penetration energy of the shaft 3, which may be needed for the deforming stroke, through the components B be calculated or estimated. The joining speed of the driver piston 30 which is transferred onto the bolt 20 during the deforming stroke by the driver piston arises from the determined penetration energy in combination with the driver piston 30 to be accelerated and the driver mass 31.

Figure 8:
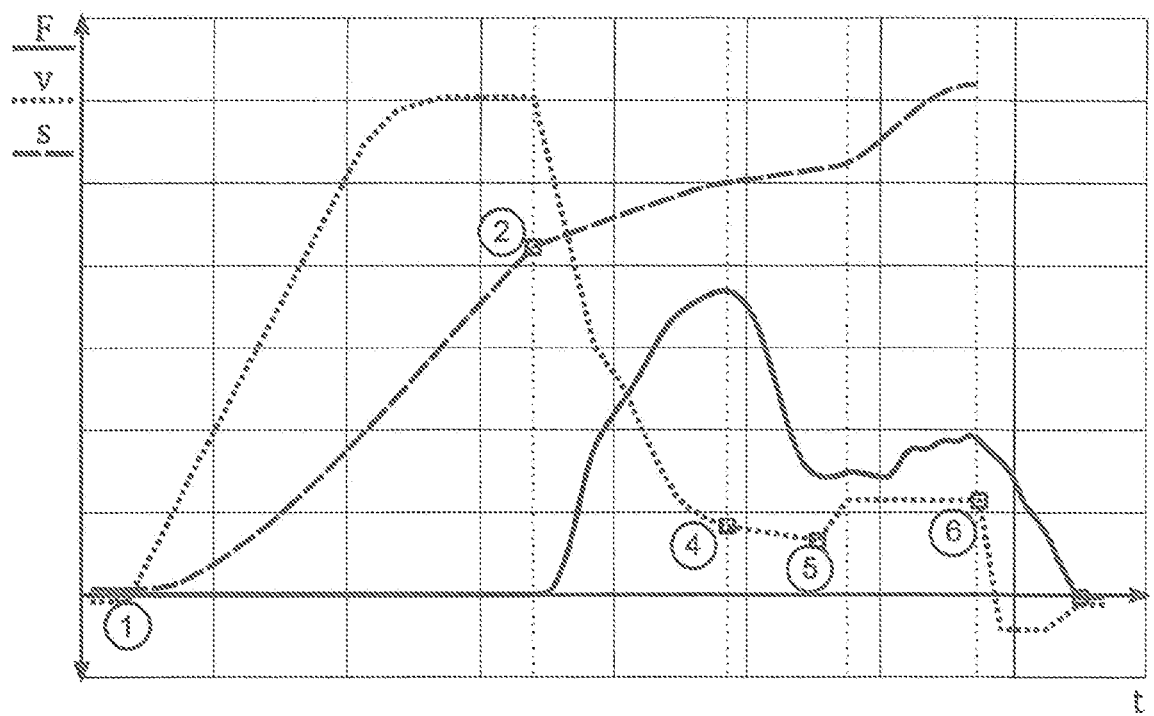
Figure 9:
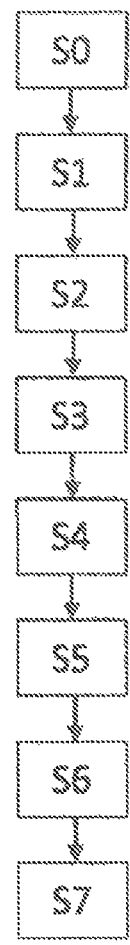

After determining the joining speed for the deforming stroke (step S0), the driver piston 30 may be accelerated to the joining speed with driver mass 31 starting at point 1 in FIG. 8. This can be seen by means of the dotted curve in FIG. 8. A plateau in the dotted curve shows the reaching of the predetermined joining speed v.

During the acceleration of the driver piston 30, the driver piston 30 moves in the joining direction and covers the distance c (dashed line in FIG. 8). As the driver piston 30 has not yet encountered the bolt 20, the force which is applied by the driver piston 30 is 0 (see solid line in FIG. 8).

The driver piston 30 encounters the bolt N at the vertical, dotted line and the point 2. This can be seen based on a bend in the dashed way curve and a decrease in the speed curve (step S2). In this connection, the driver piston 30 transmits its kinetic energy to the bolt 20 which drives the bolt 20 through the components 20 as penetration energy.

After identifying of the encountering of the driver piston 30 at the bolt 20, the control unit S switches the linear drive 40 to a kinematic mode. In the kinematic mode, the driver piston 30 and the driver piston mass 31 move due to the inertia of their masses alone. The influence of weight force contributions for accelerating or decelerating the driver piston 30 and the driver mass 31 are compensated. If the setting device 10 may be located in the horizontal, the linear drive 40 is switched off. If the setting device is located in the vertical and joins against the gravity of the bolt N, the driver piston 30 and the driver piston mass 31 are additionally driven for compensating the decelerating gravity. If the setting device 10 joins in the direction of the gravity, the driver piston 30 and the driver piston mass 31 are additionally decelerated (step S3).

While the force F which acts on the bolt 20 increases over the time t, the speed v of the driver piston 30 continues to decrease. Based on these curve progressions, it can be recognized that the kinetic energy of the bolt 20 is converted when the component material is deformed by the shaft 3. Thus, a large part of the kinetic energy of the bolt 20 may be converted into penetration energy in the deforming stroke.

The way sensor may detect the path of the driver piston 30 during the bolt setting method. From the system time present in the control unit S, the speed of the driver piston 30 is determinable based on the way information of the way sensor. The way s, the speed v of the driver piston 30 and the force F may be detected in real time, assessed or evaluated and used for controlling and regulating the bolt setting method.

While the shaft 3 penetrates the components B and is decelerated, the decrease of the speed v of the driver piston 30 is supervised or monitored by the control unit S.

A dropping below a previously defined threshold speed of the driver piston 30 at point 4 of the dotted speed curve may be recognized. At this point 4, the penetration of the shaft 3 into the components B has further decelerated the bolt 20. Based on the way s of the driver piston 30 which is recorded at the same time, it can be recognized that the tip portion of the shaft 3 and thus the shaft portion of maximum diameter may have penetrated through the components B (step S4).

Therefore, a driving of the driver piston 30 is switched on via the linear drive 40 in step S5, in order to join the bolt 20 with a penetration speed in the friction stroke into the components B until head abutment on the components B (also see point 5 in FIG. 8).

As for the further driving-in of the bolt 20 in the friction stroke, it is essentially only the static and/or sliding friction between the shaft 3 and the engaged component surface that has to be overcome, the joining speed in the friction stroke is lower than in the deforming stroke. This is also shown by the course of the speed curve in FIG. 8. The bolt 20 may be decelerated to a penetration speed of ≤85% of the initial joining speed of the deforming stroke during the deforming stroke of the bolts 20, which may be of ≤25% of the initial joining speed of the deforming stroke.

Furthermore, the energy necessary for the friction stroke may be directly generatable by the linear drive 40, without having to accelerate the driver piston 30 and the driver piston mass 31 to a certain speed in a first step.

In the further course of the friction stroke, a current consumption or generally an energy need of the linear drive 40 may be detected. As soon as the energy consumption exceeds a threshold value, the head abutment of the bolt 20 can be detected by that (step S6).

Based on the way signal and the speed signal, this is apparent from a decrease of the respective signals (point 6 in FIG. 8). Therefore, the driver piston 30 is moved back into its initial position in step S7.

According to a further method alternative, the initial joining speed of the deforming stroke is adjusted such that no additional friction stroke is necessary. Accordingly, the kinetic energy which is transferred by the driver piston 30 and the driver piston mass 31 onto the bolt 20 is precisely enough for driving the shaft 3 until the head abutment through the components B. In this connection, the head bottom side of the bolt 20 may encounter the component B which faces the head without any excess energy or with negligibly low excess energy.

Figure 10:
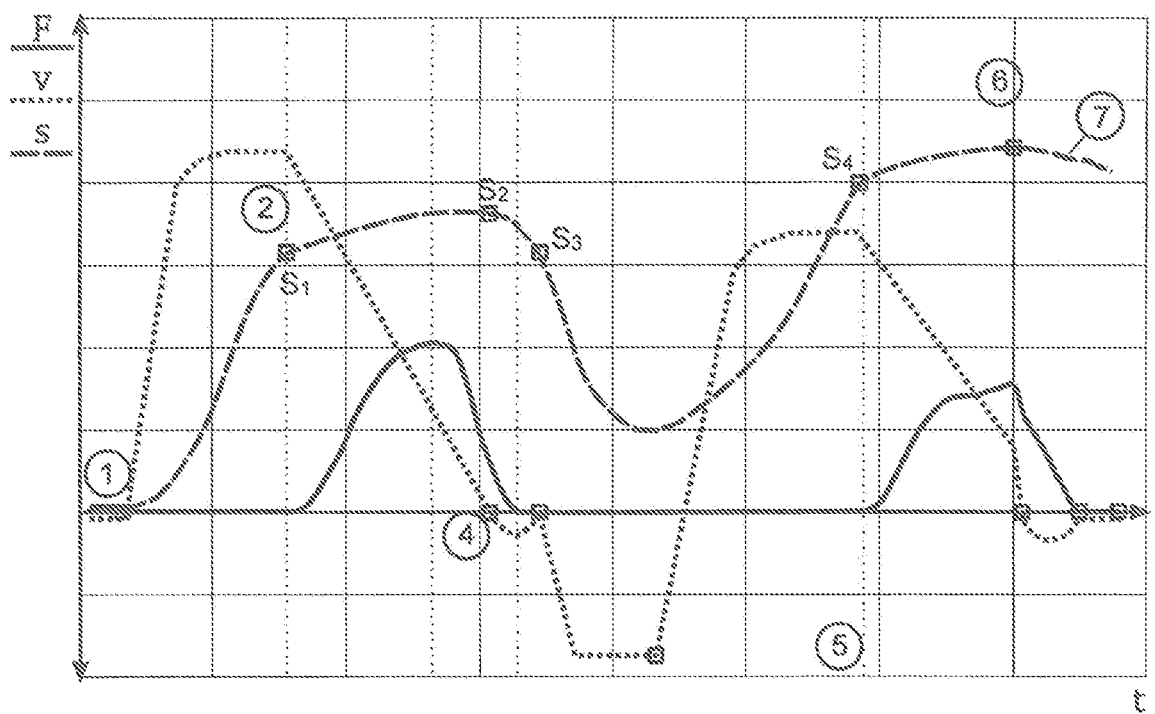
Figure 11:
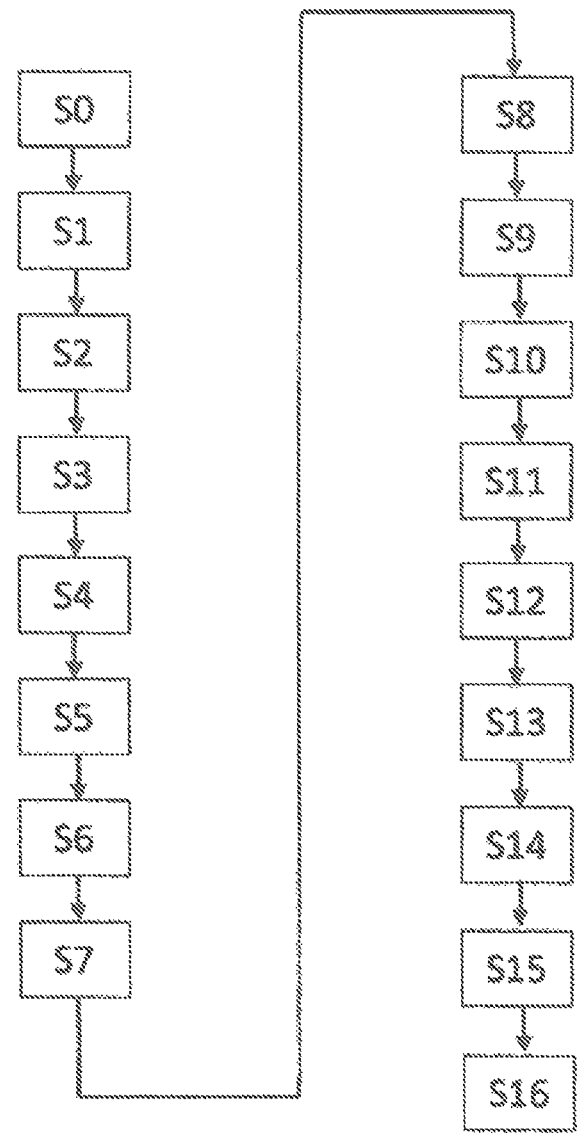

Based on the FIGS. 10 and 11, a further embodiment of the bolt setting method is explained. The first steps S0 to S2 take place in the same way as has been described above with respect to FIGS. 8 and 9. Accordingly, the driver piston 30 and the driver piston mass 31 are brought to the predetermined joining energy in the deforming stroke or deforming step, respectively, beginning at point 1 in FIG. 10, and thus to the associated kinetic energy. At the point in time of point 2, the driver piston 30 encounters the bolt 20 and the driver piston 30 is decelerated by the work of deformation of the shaft 3 taking place in the components B.

If in point 2, the driver piston 30 encounters the bolt, the corresponding way value $s_1$ is detected and stored.

Based on the speed data (see speed curve in FIG. 10), it is detected when the driver piston 30 has come to a standstill. The speed curve cuts the time axis in point 4, which synonymously means that elastic deformations of the components B may balance out and initiate a limited movement of the driver piston 30 contrary to the joining direction.

The way $s_2$ may be recorded in point 4, namely at standstill of driver piston 30 and bolt N (step S4 in FIG. 11).

Without driving the driver piston 30, it is waited in step S5 that elastic deformations in the components B and the setting device 10 balance out. This springing back of the components B also offsets the driver piston 30 contrary to the joining direction, which is stored based on a way value $s_3$ (step S5).

In step S6, the head projection of the bolt 20 with respect to the adjacent component B may be determined based on the difference $s_{31}$ of the way values $s_3$ minus $s_1$. An elastic deformation of the components B can be gathered from the difference between the way values $s_{23}=s_2-s_3$.

A characteristic diagram may be determined based on the above-described tests regarding the penetration energy of a component connection to be established. This characteristic diagram indicates with which joining speed and an associated kinetic energy of the driver piston 30, a bolt 20 with a specific head projection must be driven in, in order to reach a head abutment of the bolt 20.

The determined elastic deformation in the components B according to the way $s_{23}$ may express how much mechanical energy in the forthcoming friction stroke will again be stored in the components B for the connection without being used. The determined head projection $s_{31}$ specifies how much kinetic energy of the driver piston 30 and the driver piston mass 31 is necessary for the connection in order to join the bolt 20 into a head abutment on the components B. Therefore, it may be determined in step S7 from the characteristic diagram how much energy must at least be transferred onto the bolt 20 through the driver piston 30 and the driver piston mass 31 in order to establish the connection. In this connection, a joining speed for the necessary energy amount is indicated in the characteristic diagram, to which the driver piston 30 and the driver piston mass 31 are to be accelerated depending on their mass. To indicate in the characteristic diagram from which retraction position the driver piston 30 and the driver piston mass 31 are again to be accelerated in order to finally and completely drive in the bolt 20 in the friction stroke.

In step S8, the driver piston 30 may be moved to a retraction position contrary to the joining direction RF and accelerates from there.

In step S9, the driver piston 30 with the driver piston mass 31 may reach a third joining speed. The third joining speed in combination with the driver piston 30 and the driver piston mass 31 corresponds to a kinetic energy that is sufficiently big for joining the bolt 20 into the components B until the head abutment despite the elastic deformation of the components B.

After the driver piston 30 with driver piston mass 31 has been accelerated from the retraction position, i.e. the speed curve in FIG. 10 shows positive values, the driver piston 30 encounters the bolt 20 with head projection. This point of encountering is detected as way signal $s_4$ of the driver piston 30 and stored. It is located at the vertical, dotted line, shown by 5 (step S10).

After the encountering of the driver piston 30 on the bolt 20, the control unit S switches back to the kinematic mode (see above). Accordingly, the driver piston 30 is only moved due to the inertia of its mass and disturbing gravity influences by the spatial position of the setting device 10 are compensated (step S11).

After the switching into the kinematic mode, the bolt 20 and the driver piston 30 are decelerated by friction losses between the shaft 3 and the components B. Accordingly, the speed v of the driver piston decreases. A further decrease in speed and the force curve which is detectable at the same point in time at the time point 6 signalizes the attaching of the head 2 on the component B (step S12).

In the subsequent step S13, the way value $s_6$ may be detected at standstill of the driver piston 30.

In the subsequent step S14, elastic deformations of the components B balance out, which can be seen based on the negative speed values in the speed curve and the dropping way curve. If the elastic compensation movements in step S14 have offset the driver piston 30 contrary to the joining direction RF, the way value of the driver piston 30 is stored as $s_7$.

In step S15, it may be checked if the desired head abutment has been reached. For this purpose, the value $s_{74}=s_7-s_4$ as head projection and the value $s_{57}=s_5-s_7$ as elastic deformation are determined.

Provided these values confirm that the connection is in order, the setting process is terminated.

The invention claimed is:

1. A bolt setting method of a nail-shaped bolt with a head and a shaft extending from the head, ending in a tapered manner, into only one component or into a stack of at least two components arranged upon each other out of metal and/or plastic material, wherein the bolt is set with the bolt setting method into the only one component or into the stack of at least two components nearly rotation-free with a straight-lined setting movement with at least two steps, wherein the bolt setting method includes the following steps:
   a. joining the bolt into the only one component or into the stack of at least two components with a deforming stroke during which the bolt reaches a first joining speed of ≤4 m/s and the shaft completely penetrates the only one component or the stack of at least two components with a portion of a maximum diameter with respect to a shaft length, without a bottom side of the head abutting the at least one component or the stack of at least two components, wherein a penetration opening of the shaft generated in the only one component or in the stack of at least two components and of the connection to be established is radially extended nearly to the maximum so that the shaft carries out almost the complete deforming job when penetrating into the only one component or into the stack of at least two components during the deforming stroke, and
   b. after the deforming stroke, driving the bolt into the only one component or into the stack of at least two components until a head abutment of the bottom side of the head on the only one component or on the component of the stack of at least two components which faces the bolt head by at least one friction stroke with which a frictional connection between the shaft and the only one component or the stack of at least two components is overcome and with which the bolt reaches a second joining speed that is smaller than the first joining speed.

2. The bolt setting method according to claim 1, wherein the bolt is joined with a driver piston with a driver piston mass, wherein the driver piston mass determines a kinetic energy of the deforming stroke with a first acceleration accelerated to the first joining speed, so that the bottom side of the head is arranged at a distance to the only one component or the stack of at least two components due to the deforming stroke alone.

3. The bolt setting method according to claim 2, wherein the driver piston is arranged in a dampening, spring-pretensioned manner against a robot hand and the driver piston is driven with a linear drive in the form of a servo linear motor, an hydraulic cylinder, a pneumatic cylinder or a servo motor with transmission element, wherein during the straight-lined setting movement of the driver piston, at least one of the following quantities is determined: a path, a speed, a force of the driver piston.

4. The bolt setting method according to claim 3, wherein the driver piston, driven by the linear drive, is accelerated to the first joining speed, an encountering of the driver piston on the bolt is detected and subsequently, the driving of the driver piston is switched off.

5. The bolt setting method according to claim 4, wherein during the deforming stroke
   the bolt is decelerated by work of deformation of the bolt during a penetrating of the shaft into the only one component or the stack of at least two components to a penetration speed, which is ≤85% of the first joining speed, and
   re-driving of the driver piston with the linear drive with the second joining speed in the friction stroke that is smaller than or equal to the penetration speed.

6. The bolt setting method according to claim 5, with the further step:
- detecting the head abutment of the bolt during the friction stroke by evaluating the path and/or speed of the driver piston and
- finishing of the driving of the driver piston in the friction stroke.

7. The bolt setting method according to claim 4, wherein the bolt is completely decelerated during the deforming stroke by work of deformation in the components,
- subsequently, removing of the driver piston from the bolt into a retreat position and
- accelerating of the driver piston from the retreat position to a third joining speed, with which in the friction stroke, the driver piston drives the bolt for reaching the head abutment and which is ≤85% of the first joining speed, and
- switching-off of the driving of the driver piston after detected encountering of the driver piston on the bolt.

8. The bolt setting method according to claim 7, with the further step:
- determining a head projection of the bolt after termination of the deforming stroke and
- determining the third joining speed of the driver piston based on the head projection.

9. The bolt setting method according to claim 2, wherein the driver piston is arranged in a dampening, spring-pretensioned manner against a robot hand and the driver piston is driven with a linear drive in the form of a servo linear motor, a hydraulic cylinder, a pneumatic cylinder or a servo motor with transmission element, wherein during the straight-lined setting movement of the driver piston, at least one of the following quantities is determined: a path, a speed, a force of the driver piston.

10. The bolt setting method according to claim 9, wherein the driver piston, driven by the linear drive, is accelerated to the first joining speed, an encountering of the driver piston on the bolt is detected and subsequently, the driving of the driver piston is switched off.

11. The bolt setting method according to claim 10, wherein during the deforming stroke
- the bolt is decelerated by work of deformation of the bolt during a penetrating of the shaft into the at least one component to a penetration speed, which is ≤85% of the first joining speed, and
- re-driving of the driver piston with the linear drive with the second joining speed in the friction stroke that is smaller than or equal to the penetration speed.

12. The bolt setting method according to claim 11, with the further step:
- detecting the head abutment of the bolt during the friction stroke by evaluating the path and/or speed of the driver piston and
- finishing of the driving of the driver piston in the friction stroke.

13. The bolt setting method according to claim 10, wherein the bolt is completely decelerated during the deforming stroke by work of deformation in the only one component or in the stack of at least two components,
- subsequently, removing of the driver piston from the bolt into a retreat position and
- accelerating of the driver piston from the retreat position to a third joining speed, with which in the friction stroke, the driver piston drives the bolt for reaching the head abutment and which is ≤85% of the first joining speed, and
- switching-off of the driving of the driver piston after detected encountering of the driver piston on the bolt.

14. The bolt setting method according to claim 13, with the further step:
- determining a head projection of the bolt after termination of the deforming stroke, and
- determining the third joining speed of the driver piston based on the head projection.

* * * * *